United States Patent
Mallya

(10) Patent No.: US 10,375,115 B2
(45) Date of Patent: Aug. 6, 2019

(54) COMPLIANCE CONFIGURATION MANAGEMENT

(71) Applicant: International Business Machines Corporation, Armonk, NY (US)

(72) Inventor: Shailaja Mallya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 15/221,490

(22) Filed: Jul. 27, 2016

(65) Prior Publication Data

US 2018/0034856 A1 Feb. 1, 2018

(51) Int. Cl.
| | |
|---|---|
| H04L 29/06 | (2006.01) |
| G06Q 30/04 | (2012.01) |
| G06F 21/51 | (2013.01) |
| G06F 21/57 | (2013.01) |

(52) U.S. Cl.
CPC .............. *H04L 63/20* (2013.01); *G06F 21/51* (2013.01); *G06F 21/57* (2013.01); *G06Q 30/04* (2013.01); *H04L 63/10* (2013.01); *H04L 63/102* (2013.01); *H04L 63/105* (2013.01); *H04L 63/1408* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,413,147 B2 | 4/2013 | Shen et al. | |
| 8,661,434 B1 | 2/2014 | Liang et al. | |
| 9,251,349 B2 | 2/2016 | Haikney et al. | |
| 2008/0134175 A1* | 6/2008 | Fitzgerald | G06F 9/45533 718/1 |
| 2011/0099548 A1* | 4/2011 | Shen | G06F 9/45558 718/1 |
| 2013/0097296 A1* | 4/2013 | Gehrmann | G06F 9/4856 709/223 |
| 2014/0053226 A1* | 2/2014 | Fadida | H04L 67/34 726/1 |
| 2014/0137244 A1* | 5/2014 | Banerjee | G06F 21/52 726/22 |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Andrew J Steinle
(74) *Attorney, Agent, or Firm* — Daniel R. Simek

(57) ABSTRACT

Disclosed aspects relate to compliance configuration management for asset migration on a shared pool of configurable computing resources having a set of compute nodes. A migration request to migrate an asset coupled with a first compliance configuration from a source compute node to a target compute node may be detected. The first compliance configuration coupled with the asset on the source compute node may be compared with an expected compliance configuration for the target compute node. Based on and in response to the comparing, a mismatch of the first compliance configuration with respect to the expected compliance configuration may be determined. A set of response actions may be performed with respect to the migration request.

18 Claims, 8 Drawing Sheets

(56) References Cited

U.S. PATENT DOCUMENTS

2014/0173598 A1* 6/2014 Haikney .................. G06F 21/53
718/1
2015/0121369 A1* 4/2015 Thankappan ....... G06F 9/45533
718/1
2015/0263859 A1* 9/2015 Lietz ................... H04L 63/0281
713/168

OTHER PUBLICATIONS

TechTarget, "What is cloud bursting?", <http://searchcloudcomputing.techtarget.com/definition/cloud-bursting>.
Kathpal, Prateek; "Cloud Burst—The First Visual Collaboration Infrastructure as a Service"; Polycom; <http://community.polycom.com/t5/The-View/Cloud-Burst-The-First-Visual-Collaboration-Infrastructure-as-a/ba-p/78212>.

\* cited by examiner

COMPLIANCE CONFIGURATION MANAGEMENT

BACKGROUND

This disclosure relates generally to computer systems and, more particularly, relates to compliance configuration management for a shared pool of configurable computing resources. The amount of data that needs to be managed by enterprises is increasing. Data transfer between network nodes may be desired to be performed as efficiently as possible. As data needing to be managed increases, the need for efficient data transfer may increase.

SUMMARY

Aspects of the disclosure relate to compliance configuration management for a shared pool of configurable computing resources having a set of compute nodes. The compliance levels of assets may be dynamically modified based on the compliance configuration of the compliance group to which the asset is migrated. When transferring an asset from a higher compliance level to a lower compliance level group, administrative authorization may be obtained from a trusted centralized server to permit transfer of the asset. A hypervisor may be used to facilitate communication between the trusted centralized server and the asset. When transferring an asset from a lower compliance level to a higher compliance level group, the compliance level of the asset may be dynamically boosted to match the compliance configuration of the target group. Leveraging dynamic adjustment of compliance levels may be associated with increased data transfer efficiency and data security.

Disclosed aspects relate to compliance configuration management for asset migration on a shared pool of configurable computing resources having a set of compute nodes. A migration request to migrate an asset coupled with a first compliance configuration from a source compute node to a target compute node may be detected. The first compliance configuration coupled with the asset on the source compute node may be compared with an expected compliance configuration for the target compute node. Based on and in response to the comparing, a mismatch of the first compliance configuration with respect to the expected compliance configuration may be determined. A set of response actions may be performed with respect to the migration request.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
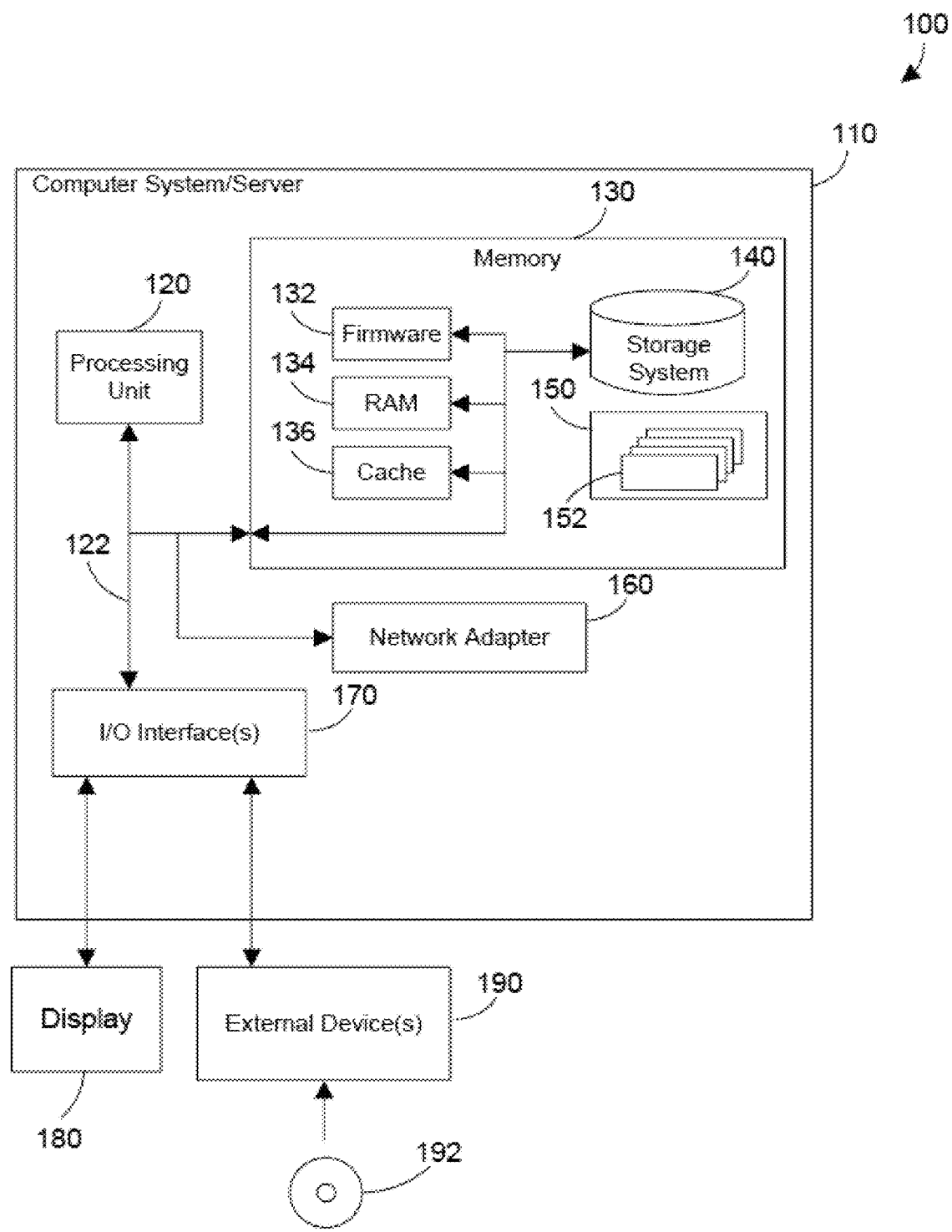
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to compliance configuration management for a shared pool of configurable computing resources having a set of compute nodes. The compliance levels of assets (e.g., applications, virtual machines) may be dynamically modified based on the compliance configuration (e.g., security level, access policy) of the compliance group to which the asset is migrated. When transferring an asset from a higher compliance level to a lower compliance level group, administrative authorization may be obtained from a trusted centralized server (e.g., trusted migration monitor) to permit transfer of the asset. A hypervisor may be used to facilitate communication between the trusted centralized server and the asset. When transferring an asset from a lower compliance level to a higher compliance level group, the compliance level of the asset may be dynamically boosted to match the compliance configuration of the target group. Leveraging dynamic adjustment of compliance levels may be associated with increased data transfer efficiency and data security.

Maintaining efficient methods of data migration between different network locations is one important aspect of managing network environments. Migrating assets, data, applications, and virtual machines from one compute node of a network to another can often be both time and bandwidth intensive, and differences in compliance levels (e.g., security protocols/environments) between assets to be transferred may be associated with data security issues. Accordingly, aspects of the disclosure relate to ascertaining a difference between the compliance level of a source compute node (e.g., hosting an asset) and a target compute node (e.g., destination host for the asset), and modifying the compliance configuration of the asset to match the compliance level of the target compute node. For instance, the compliance level of the asset may be raised or lowered to match that of the target compute node. Compliance level modification may be associated with benefits including asset operation efficiency and data security.

Aspects of the disclosure include a method, system, and computer program product for compliance configuration management for asset migration on a shared pool of configurable computing resources having a set of compute nodes. A migration request to migrate an asset coupled with a first compliance configuration from a source compute node to a target compute node may be detected. The asset may include a virtual machine. The first compliance configuration coupled with the asset on the source compute node may be compared with an expected compliance configuration for the target compute node. Based on and in response to the comparing, a mismatch of the first compliance configuration with respect to the expected compliance configuration may be determined. In response to determining the mismatch and in advance of performing the set of response actions, the asset may be marked with a debriefing zone indicator. A set of response actions may be performed with respect to the migration request.

In embodiments, the set of response actions may include migrating the virtual machine from the source compute node to the target compute node. In response to migrating the virtual machine, the first compliance configuration may be modified to a second compliance configuration which matches the expected compliance configuration for the target compute node. In embodiments, a first compliance level of the first compliance configuration may exceed a second compliance level of the second compliance configuration. In embodiments, a permission requested to change the first compliance level to the second compliance level may be transmitted by a hypervisor to a root user. An authorization to change the first compliance level to the second compliance level may be received by the hypervisor from the root user. The root user may publish an indication of the authorization for a set of subscriber administrator users. In embodiments, an authentication to change the first compliance level to the second compliance level may be received from a migration monitor. In embodiments, a denial to change the first compliance level to the second compliance level may be received, and migration and modification may be prevented.

In embodiments, the set of response actions may include modifying the first compliance configuration to a second compliance configuration which matches the expected compliance configuration for the target node. In response to modifying the first compliance configuration to the second compliance configuration, the virtual machine may be migrated from the source compute node to the target compute node. In embodiments, a second compliance level of the second compliance configuration may exceed a first compliance level of the first compliance configuration. In embodiments, both the modifying and the migrating may each occur in an automated fashion without user intervention.

In embodiments, a first compliance level of the first compliance configuration may exceed a second compliance level of the second compliance configuration, and the set of response actions may be performed in reliance upon one or more user inputs. In embodiments, the second compliance level of the second compliance configuration may exceed the first compliance level of the first compliance configuration, and all aspects of the set of response actions may be performed in an automated fashion without user intervention. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
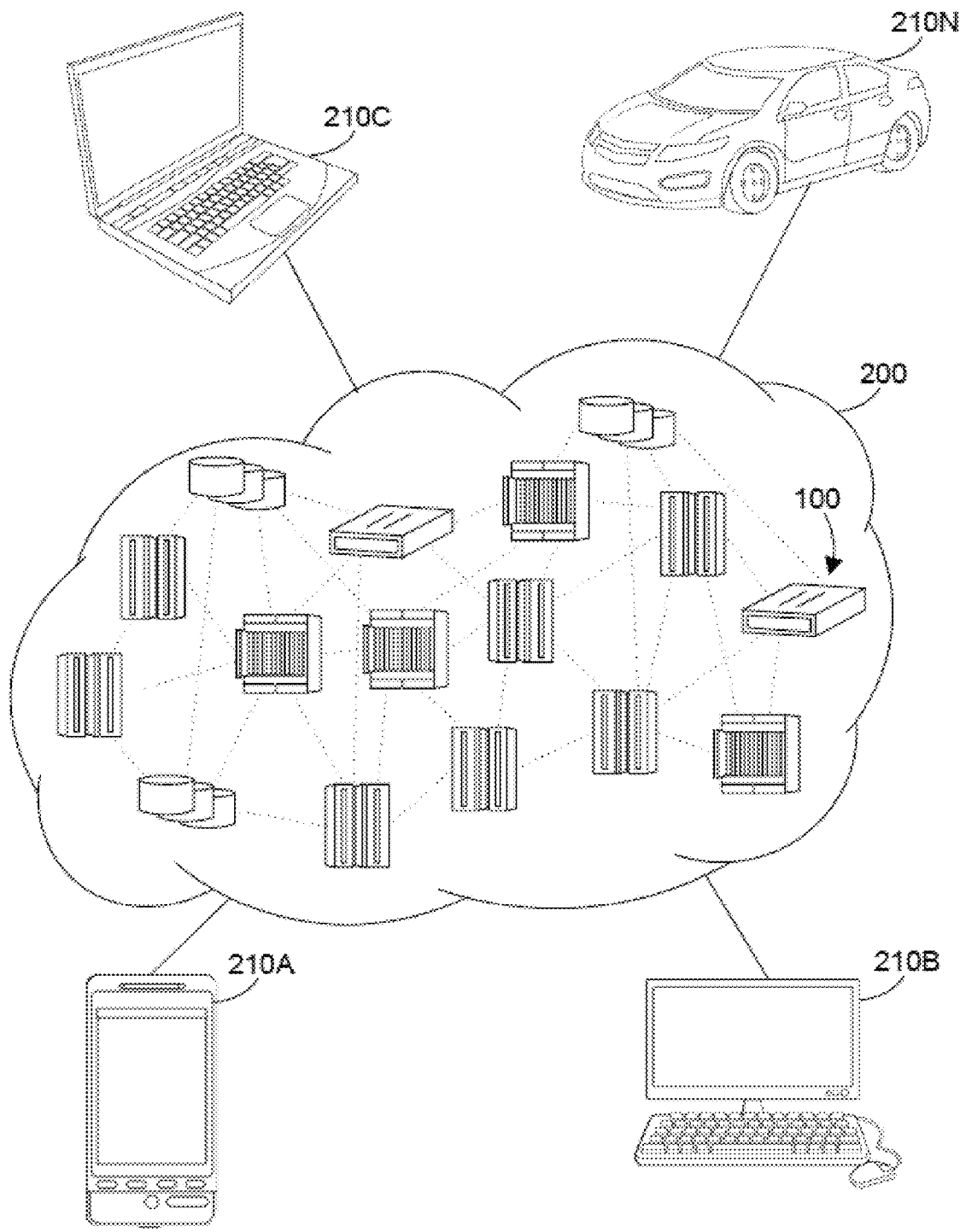
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
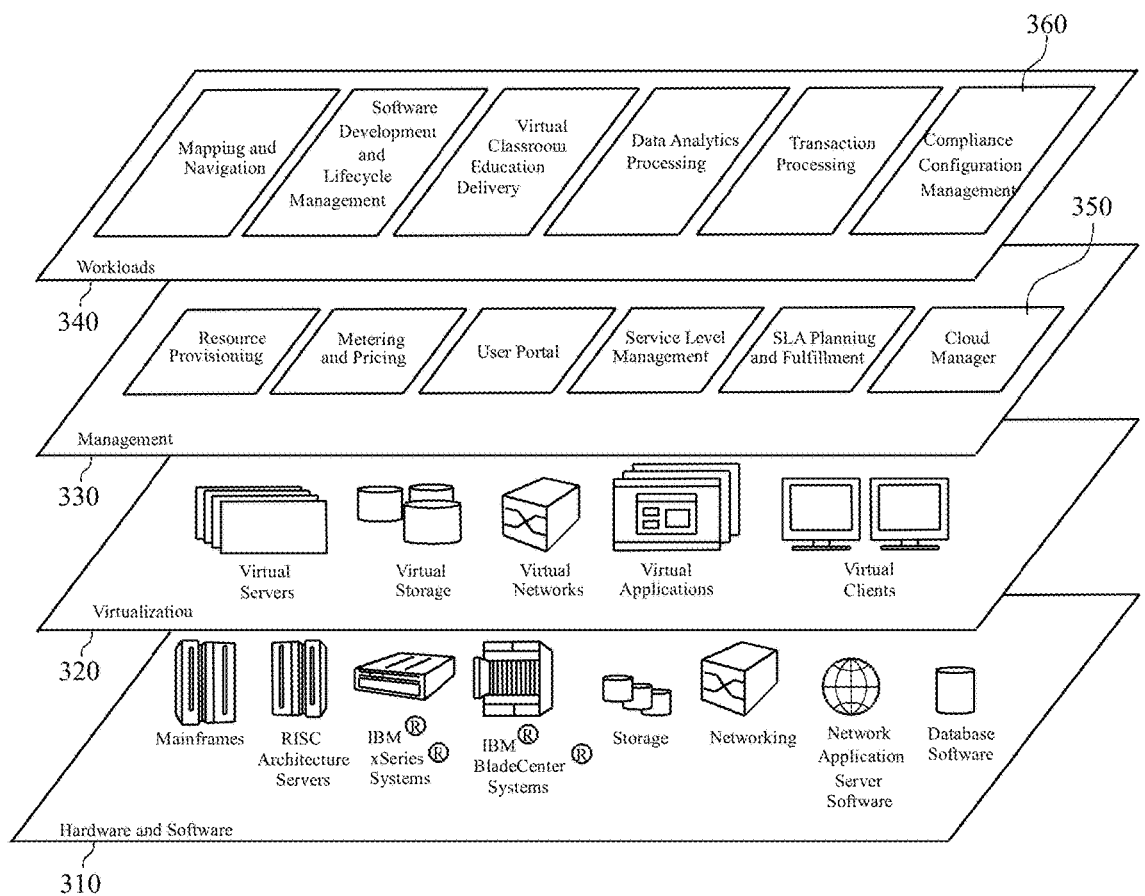
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and rearrangement management 360, which may be utilized as discussed in more detail below.

Figure 4:
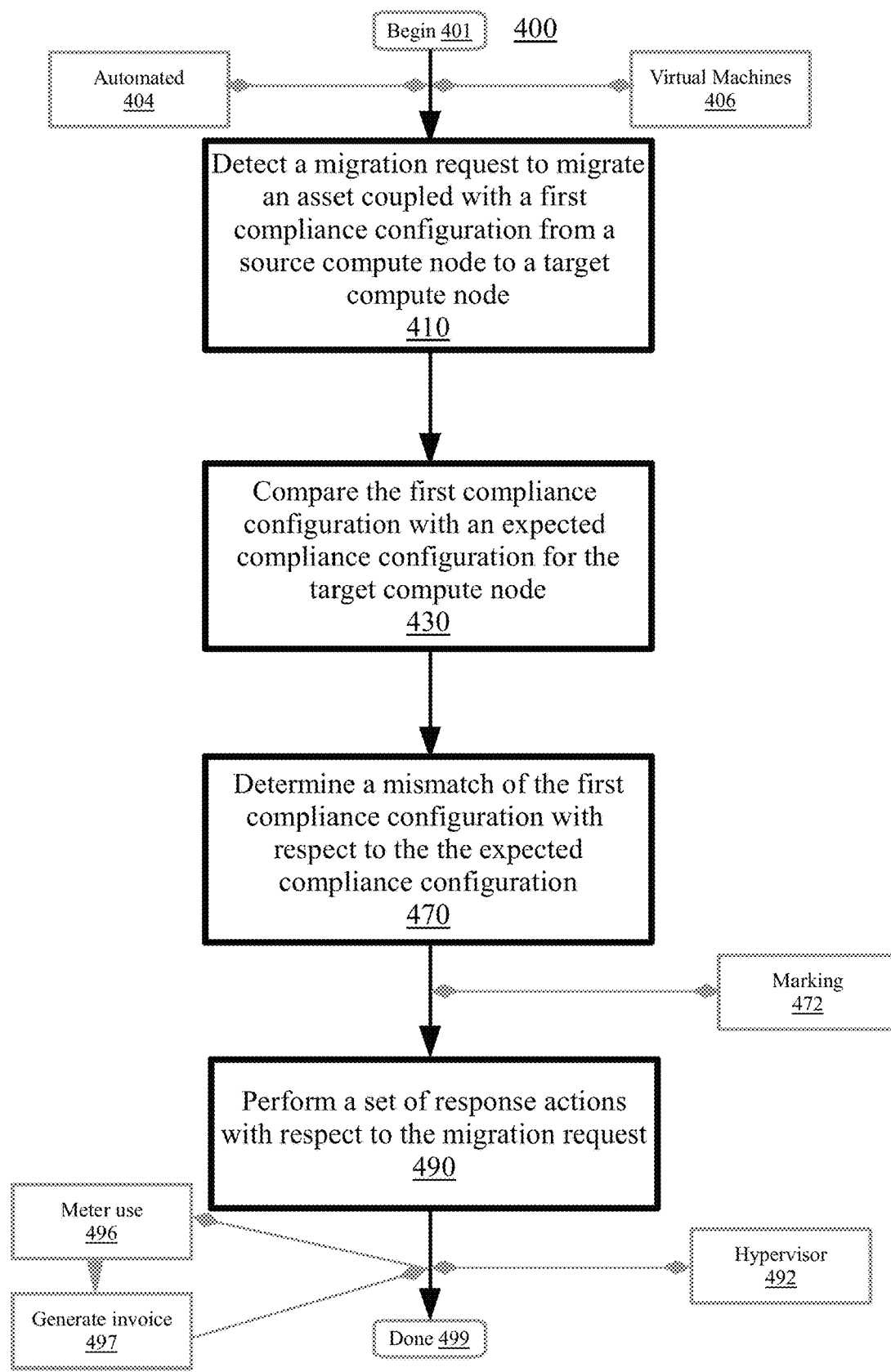
FIG. 4 is a flowchart illustrating a method of compliance configuration management for asset migration on a shared pool of configurable computing resources having a set of compute nodes, according to embodiments.

FIG. 4 is a flowchart illustrating a method 400 of compliance configuration management for asset migration on a shared pool of configurable computing resources having a set of compute nodes. Aspects of FIG. 4 relate to dynamically modifying the compliance levels of assets based on a compliance configuration of a compliance group (e.g., target compute node) to which the asset is migrated. In this way, the compliance levels and security protocols of the asset may be aligned with those of the new host to facilitate data security of information stored on the asset and promote safe operation of the asset on the target compute node. Leveraging dynamic adjustment of compliance levels may be associated with data transfer efficiency and data security. The method 400 may begin at block 401.

In embodiments, the detecting, the comparing, the determining, the performing, and other steps described herein may each occur in an automated fashion without user intervention at block 404. In embodiments, the detecting, the comparing, the determining, the performing, and other steps described herein may be carried out by an internal compliance configuration management module maintained in a persistent storage device of a computing node that hosts the asset (e.g., source compute node, target compute node). In certain embodiments, the detecting, the comparing, the determining, the performing, and other steps described herein may be carried out by an external compliance configuration management module hosted by a remote computing device or server (e.g., accessible via a subscription, usage-based, or other service model). In this way, aspects of compliance configuration management may be performed using automated computing machinery without manual action. Other methods of performing the steps described herein are also possible.

In embodiments, the asset may include a virtual machine at block 406. Generally, the asset may include software applications, virtualized computing environments, or other physical or logical computing resources. In embodiments, the asset may include one or more virtual machines. The virtual machines may include emulated computer system environments based on designated computer architectures and configured to perform one or more tasks or functions. For instance, the set of virtual machines may include system virtual machines configured to provide a complete system platform and operating system, or process virtual machines designed to run particular programs. In certain embodiments, the asset may include one or more logical partitions. The logical partitions may include subsets of a computer's hardware resources that are virtualized as a separate computer. In this way, a physical machine may be partitioned into multiple logical partitions, each logical partition hosting a separate operating system. As described herein, in embodiments, the asset may be configured to be migrated from a source compute node to a target compute node. In embodiments, the source and target compute nodes may include one or more types of data communication equipment (e.g., modems, hubs, bridges, switches), data terminal equipment (e.g., mobile computing device, host computer, router, workstation, server), connection points, redistribution points, or other communication endpoints for hosting and managing computing resources in a network environment. In embodiments, the source and target compute nodes may include physical electronic devices configured to create, receive, and transmit information over a communications channel of the network. Other types of assets, source compute nodes, and target compute nodes are also possible.

At block 410, a migration request to migrate an asset coupled with a first compliance configuration may be detected. The migration request may request that the asset be migrated from a source compute node to a target compute node. Generally, detecting can include sensing, discovering, recognizing, identifying, or otherwise ascertaining the migration request to migrate the asset coupled with the first compliance configuration. In embodiments, the first compliance configuration may include a combination of one or more protocols (e.g., data transmission protocol), stored information (e.g., confidential information versus non-sensitive information), criterion (e.g., resource requirements), properties (e.g., usage history), and other parameters that define characteristics of a suitable security environment for the asset. For instance, the first compliance configuration may specify data security requirements, computing resource requirements, and other stipulations that must be met by potential host compute nodes in order to receive deployment of the asset. In embodiments, the migration request may include a command, set of instructions, application, or inquiry to transfer the asset from the source compute node to the target compute node. The migration request may be submitted by a user or network administrator, centralized management server (e.g., for resource balancing between hosts), by the source compute node (e.g., request to reduce the workload), by the target compute node (e.g., need for the asset), or the like. In embodiments, the migration request may be detected by a migration monitor module located on a compute node of the network. In embodiments, the migration request may be detected by the source compute node. Other methods of detecting the migration request are also possible.

Consider the following example. A source compute node may host an asset. The asset may include a virtual machine configured to serve as a testing environment for streaming applications. The source compute node may include a migration monitor tool configured to receive and manage migration of assets between different compute nodes of the network. In embodiments, the migration monitor tool of the source compute node may detect a migration request to transfer the asset from the source compute node to a target compute node. In certain embodiments, detecting the migration request may include verifying a reason for the request to migrate the asset. As an example, the migration request may indicate that the target compute node has need of the asset for use in testing a particular stream application. In certain embodiments, the migration request may be submitted from the target compute node to a central arbitration server that verifies the migration request and forwards it to the source compute node. Other methods of detecting and managing the migration request are also possible.

At block 430, the first compliance configuration coupled with the asset on the source compute node may be compared with an expected compliance configuration for the target compute node. Generally, comparing can include inspecting, contrasting, analyzing, juxtaposing, evaluating, or otherwise assessing the first compliance configuration and the expected compliance configuration. The expected compliance configuration may include a combination of one or more protocols (e.g., data transmission protocol), stored information (e.g., confidential information versus non-sensitive information), criterion (e.g., resource requirements), properties (e.g., usage history), and other parameters that define expected characteristics of the security environment of the target compute node. In embodiments, comparing may include ascertaining the relative compliance level of the asset with respect to the target compute node. The compliance level may indicate a quantitative measurement of the degree of security maintained by a particular asset or compute node (e.g., Level 1, Level 2, Level 3). For instance, comparing may include ascertaining whether the first compliance configuration is higher (e.g., greater security, stricter management requirements) or lower (e.g., lesser security, more relaxed management requirements) than the expected compliance configuration. Based on the compliance level of the first compliance configuration and the expected compliance configuration, the compatibility of the source node with respect to the asset may be determined. Other methods of comparing the first compliance configuration with the expected compliance configuration are also possible.

Consider the following example. The asset may be coupled with a first compliance configuration having a compliance level of Level 1 (e.g., strict security). The first compliance configuration may indicate that the asset contains sensitive, confidential data related to users' financial transactions. Accordingly, the expected compliance configuration of the target compute node may be evaluated to ascertain the compatibility of the target compute node for the asset (e.g., whether or not the asset and the sensitive data can be migrated as it is, if the data should be modified prior to migration). In embodiments, examining the expected compliance configuration may indicate that the expected compliance configuration has a compliance level of Level 2 (e.g., lower security level than Level 1). Based on the determined compliance levels for the first compliance configuration and the expected compliance configuration, one or more properties or attributes of the asset and the target compute node may be compared. For instance, attributes such as data management measures, security breach protocols, encryption levels and the like may be contrasted to evaluate the compatibility of the target compute node for the asset. In certain embodiments, the compatibility of the target compute node with respect to the asset may be represented as a quantitative measure (e.g., 75% match). Other methods of comparing the first compliance configuration and the expected compliance configuration are also possible.

At block 470, a mismatch of the first compliance configuration with respect to the expected compliance configuration may be determined. The mismatch may be determined based on and in response to comparing. Generally, determining can include identifying, computing, resolving, or otherwise ascertaining the mismatch between the first compliance configuration and the expected compliance configuration. In embodiments, the mismatch may include a discrepancy, disparity, divergence, or other dissimilarity between the first compliance configuration and the expected compliance configuration. For instance, the mismatch may indicate that the asset is associated with a different security level (e.g., data management policy, encryption level) than the target compute node (e.g., higher or lower compliance level). In embodiments, determining the mismatch may be based on an evaluation of the first compliance configuration and the expected compliance configuration. For instance, in response to comparing the first compliance configuration and the expected compliance configuration, an incompatibility between the security parameters required by the asset (e.g., in order to maintain data security) and the security environment provided by the target compute node may be detected. As another example, in certain embodiments determining the mismatch may include generating a similarity value (e.g., quantitative indication of the degree of correspondence or alignment of the security environments) for the asset with respect to the target compute node, and comparing the similarity value to a similarity threshold. In response to ascertaining that the similarity value does not achieve the similarity threshold (e.g., similarity value of 67 does not achieve the threshold value of 75), the mismatch may be determined. Other methods of determining the mismatch of the first compliance configuration with respect to the expected compliance configuration are also possible.

Consider the following example. As described herein, the first compliance configuration of the asset may be compared with the expected compliance configuration of the target compute node. In response to the comparison, it may be determined that the asset is associated with a compliance level of Level 4 (e.g., low, relaxed security) and the expected compliance configuration of the target compute node is associated with a compliance level of Level 2 (e.g., substantially strict security). Aspects of the disclosure relate to the recognition that, in certain situations, migration of an asset having a lower compliance level to a target compute node having a higher compliance level may be associated with security risks (e.g., security exploits of the low-security asset may be transferred to the higher security compute node, resulting in potential security vulnerabilities). Accordingly, the difference in compliance levels between the asset and the target compute node (e.g., Level 4 versus Level 2), may be determined as a mismatch between the first compliance configuration and the expected compliance configuration. Other methods of detecting the mismatch are also possible.

In embodiments, an asset (e.g., virtual machine) may be marked with a debriefing zone indicator at block 472. The asset may be marked with the debriefing zone indicator in response to determining the mismatch and in advance of performing a set of response actions. Generally, marking can include indicating, labeling, tagging, characterizing, identifying, specifying, or otherwise designating the assets with the debriefing zone indicator. The debriefing zone indicator may represent that the asset is scheduled for a change or modification to its compliance configuration. In embodiments, assets marked with the debriefing zone indicator may continue normal operations until/during compliance configuration modification. In embodiments, marking may include notifying one or more administrators (e.g., network administrator, network migration monitor system) that a particular asset requires compliance configuration modification either before or after migration to another compute node. For instance, marking may include creating an entry for the asset in a debriefing zone management database that indicates the type of compliance configuration modification needed by the asset (e.g., compliance level raising/lowering), the time/date for which the compliance configuration modification is scheduled, the destination compute node to which the asset is to be migrated, and other information about the asset. Other methods of marking the asset with the debriefing zone indicator are also possible.

At block 490, a set of response actions with respect to the migration request may be performed. Generally, performing can include executing, initializing, instantiating, carrying-out, or otherwise implementing the set of response actions with respect to the migration request. The set of response actions may include one or more processes, procedures, or other operations to alter, revise, modify, or otherwise change the compliance configuration of the asset (e.g., to facilitate migration of the asset from the source compute node to the target compute node). In embodiments, performing may include selecting one or more response actions from a candidate list of response actions. As examples, a candidate list of response actions may include raising the compliance level of the asset (e.g., encrypting data, adopting stricter data security protocols), lowering the compliance level of the asset (e.g., removing sensitive data, adopting looser data security protocols), or the like. Accordingly, performing may include selecting one or more response actions from the candidate list of response actions, and using a trusted migration monitoring module to execute the selected response actions with respect to the asset. Other methods of performing the set of response actions with respect to the migration request are also possible.

In embodiments, performing the set of response actions may include using a hypervisor to communicate between a cloud manager and the set of compute nodes at block 492. Generally, using the hypervisor may include facilitating transmission of instructions, commands, notifications, and other communication between the cloud manager and the set of compute nodes. In embodiments, in response to determining a mismatch between the first compliance configuration of the asset and the expected compliance configuration of the target compute node, authorization may be required in order to move forward with the migration, halt the migration, or perform one or more of the set of response actions. Accordingly, in certain embodiments, the hypervisor may be configured to send a notification (e.g., electronic mail message, dialogue box, notification) to an administrator of the operating system to request authorization or instructions regarding migration of the asset. In embodiments, the authorization or instructions received from the administrator may be conveyed to the set of compute nodes via the hypervisor. Other methods of using the hypervisor to facilitate communication between the cloud manager and the set of compute nodes are also possible.

Consider the following example. A migration request to migrate a first asset having a first compliance configuration from a source compute node to a target compute node may be detected. The first asset may include a virtual machine containing data regarding computing resource usage history for a set of compute nodes. As the first asset does not include any sensitive or proprietary data, the first asset may be associated with a relatively low security level. For instance, the first compliance configuration may have a compliance level of Level 3 (e.g., relaxed security). In response to receiving the migration request to migrate the first asset to a target compute node, the first compliance configuration of the first asset may be compared to the expected compliance configuration of the target compute node. In embodiments, the expected compliance configuration of the target compute node may have a compliance level of Level 2 (e.g., stricter security than Level 3). As such, it may be determined that the compliance level of the first asset mismatches the compliance level of the target compute node (e.g., moving the asset from a lower compliance level to a higher compliance level may introduce security vulnerabilities). In embodiments, in response to determining the mismatch between the compliance levels of the first asset and the target compute node, a set of response actions may be performed. For instance, performing the set of response actions may include adjusting the compliance configuration of the first asset to raise the compliance level of the first asset to correspond (e.g., match) the compliance level of the target compute node (e.g., by increasing the encryption level of the asset). Other methods of managing the compliance configurations of the first asset and the target compute node are also possible.

In embodiments, use of compliance configuration management may be metered at block 496. Metering can include measuring, tracking, documenting, recording, or calculating the degree or extent of the utilization of the compliance configuration management operations. The degree of utilization may be calculated based on the number of times compliance configuration management operations were utilized (e.g., 10 times, 100 times), the amount of data managed using compliance configuration management operations (e.g., assets transferred using compliance configuration management), application configurations (e.g., computer configurations, compliance configuration parameters), resource usage (e.g., data processed by compliance configuration management) or other means. Based on the metered use, an invoice may be generated at block 497. The invoice may include a bill, fee, service charge, or other itemized breakdown specifying compensation for the usage of compliance configuration management. Subscription based models are also possible.

Method 400 concludes at block 499. Aspects of method 400 may provide performance or efficiency benefits for compliance configuration management. For example, aspects of method 400 may have positive impacts with respect to facilitating migration of an asset from a source compute node to a target compute node. As described herein, the detecting, the comparing, the determining, the performing, and other steps described herein may each occur in an automated fashion without user intervention. Altogether, leveraging dynamic adjustment of compliance levels may be associated with increased data transfer efficiency and data security.

Figure 5:
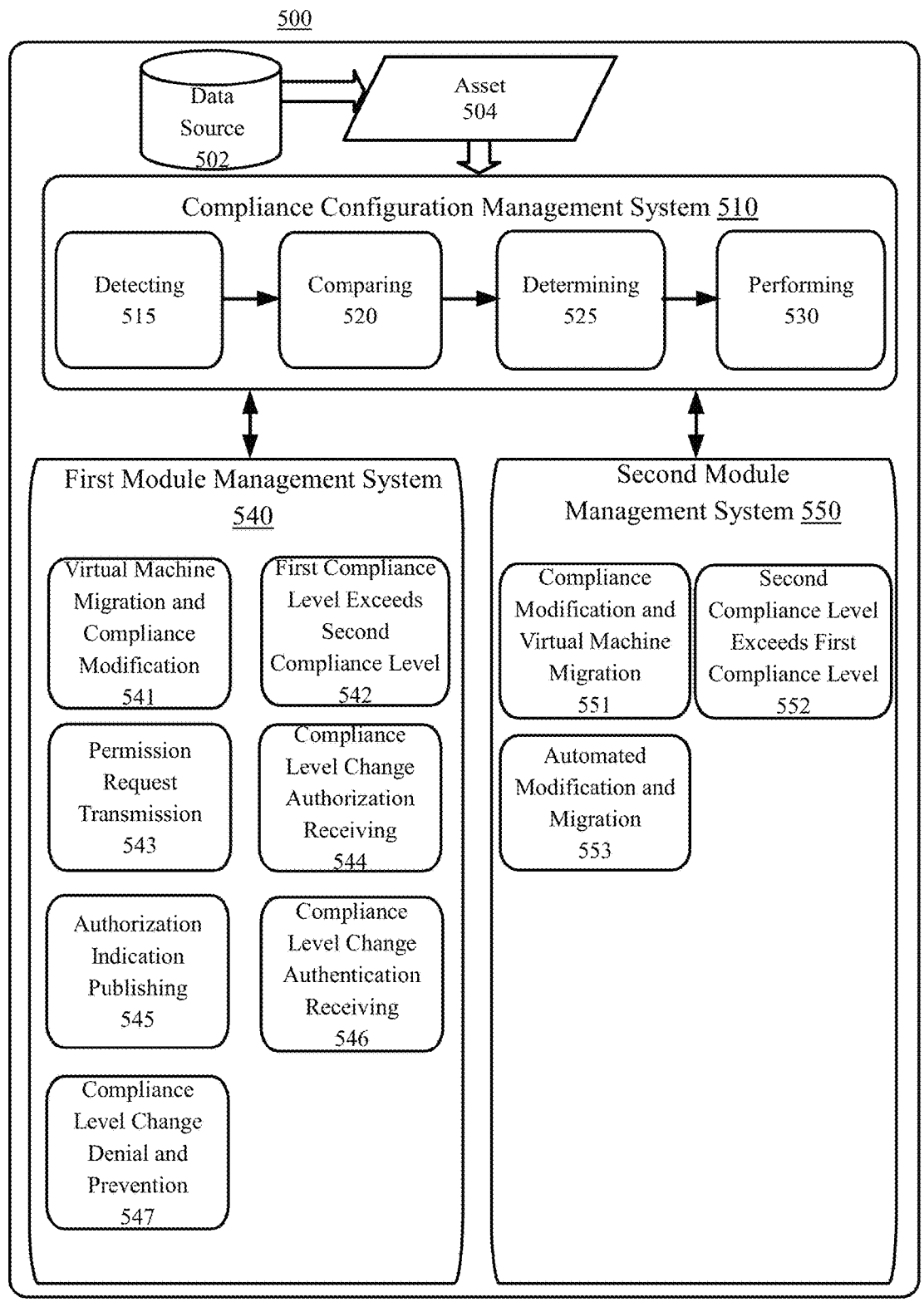
FIG. 5 shows an example system for compliance configuration management for a shared pool of configurable computing resources having a set of compute nodes, according to embodiments.

FIG. 5 shows an example system 500 for compliance configuration management for a shared pool of configurable computing resources having a set of compute nodes, according to embodiments. Aspects of FIG. 5 are directed toward facilitating modification of compliance configurations for assets and migration of the assets from source compute nodes to target compute nodes. In embodiments, the modification and migration of assets may be based on authorization received from a migration monitor or a root user. The example system 500 may include a data source 502 (e.g., storage device, database, compute node) that provides an asset 504. The asset 504 may be configured to be processed by the compliance configuration management system 510. In embodiments, the compliance configuration management system 510 may include a detecting module 515 to detect a migration request to migrate an asset from a source compute node to a target compute node, a comparing module 520 to compare a first compliance configuration of the source compute node to an expected compliance configuration of the target compute node, a determining module 525 to determine a mismatch of the first compliance configuration with respect to the expected compliance configuration, and a performing module 530 to perform a set of response actions with respect to the migration request. The compliance configuration management system 510 may be communicatively connected with a first module management system 540 and a second module management system 550 that each include one or more modules for performing other operations related to compliance configuration management.

In embodiments, the first module management system 540 may include a plurality of modules configured to facilitate compliance configuration management for an asset having a first compliance configuration. Aspects of the disclosure, in certain embodiments, relate to the recognition that in situations in which an asset is to be transferred from a higher compliance level environment to a lower compliance level environment, it may be desirable to migrate the asset to the target compute node prior to modification of the compliance configuration for the asset (e.g., modification of the compliance configuration for the asset prior to migration may be associated with security risks for the source compute node.) Accordingly, in embodiments, the asset (e.g., virtual machine) may be migrated from the source compute node to a target compute node at module 541 (e.g., prior to compliance level modification). Generally, migrating can include transferring, deploying, allocating, transmitting, sending, or otherwise moving the asset from the source compute node to the target compute node. For instance, migrating may include performing a data transfer operation to relocate files related to the asset from an original directory of the source compute node to a destination directory on a storage device of the target compute node. In embodiments, migrating may include configuring the target compute node to operate the asset (e.g., allocating resources for the asset, modifying network ports/communication protocols for the asset).

In embodiments, in response to migrating the virtual machine, the first compliance configuration may be modified to a second compliance configuration which matches the expected compliance configuration for the target compute node. Generally, modifying can include altering, adjusting, reconfiguring, revising, or otherwise changing the first compliance configuration to a second compliance configuration which matches the expected compliance configuration for the target compute node. In embodiments, modifying may include raising or lowering the compliance level of the asset to align (e.g., be substantially equivalent to) the compliance level of the target compute node. For example, one or more characteristics of the asset such as one or more protocols (e.g., data transmission protocols, network communication protocols), stored information (e.g., nature/privacy level of data maintained on the asset) system criterion (e.g., resource usage configurations) and other aspects of the security environment of the asset may be adjusted to match that of the target compute node. Other methods of migrating and modifying the first compliance configuration are also possible.

In embodiments, a first compliance level of the first compliance configuration may exceed a second compliance level of the second compliance configuration at module 542.

As described herein, the first and second compliance level may indicate quantitative measurements of the degree of security maintained by a particular asset or compute node (e.g., Level 1, Level 2, Level 3). Accordingly, in certain embodiments, the first compliance level (e.g., of the asset) may be greater than a second compliance level (e.g., of the target compute node), such that the asset is transferred from an environment having higher security (e.g., greater compliance level) to an environment having lower security (e.g., lesser compliance level). As such, aspects of the disclosure relate to first migrating the asset from the source compute node to the target compute node, and subsequently modifying the compliance configuration of the asset by lowering the compliance level of the asset to match that of the target compute node. Other methods of managing the asset are also possible.

Consider the following example. An asset may include a virtual machine having a set of data regarding users' medical records. Accordingly, the first compliance configuration may be associated with a substantially high security level to safely maintain the sensitive medical data. For instance, the asset may be associated with a compliance level of Level 1 (e.g., substantially strict security). In embodiments, the asset may be scheduled to be migrated from a source compute node to a target compute node having a compliance level of Level 2 (e.g., lower/less strict than Level 1). As described herein, in certain embodiments, aspects of the disclosure relate to transferring assets from environments having higher compliance levels to environments having lower compliance levels, and modifying the compliance configuration of the asset to match that of the destination environment. In embodiments, the asset may first be migrated from the source compute node to the target compute node (e.g., prior to compliance level modification). In response to migrating the asset to the target compute node, the compliance level of the asset may be lowered from Level 1 to Level 2 in order to match the compliance configuration of the target compute node. In embodiments, lowering the compliance level of the asset may include removing (e.g., deleting, omitting) the set of data regarding users' medical records from the asset such that the asset can be maintained at a lower compliance level without concern of sensitive information being compromised. In certain embodiments, lowering the compliance level may include editing the set of data (e.g., removing the names/personal information from the set of data) to protect the anonymity of the users. Other methods of modifying the compliance configuration by lowering the compliance level of the asset are also possible.

In embodiments, a permission request to change the first compliance level to the second compliance level may be transmitted at module 543. The permission request may be transmitted by a hypervisor to a root user. Generally, transmitting can include conveying, transferring, forwarding, relaying, or otherwise sending the permission request. As described herein, aspects of the disclosure relate to modifying the compliance configuration of the asset by changing the first compliance level to a second (e.g., lower) compliance level to match the compliance configuration of the target compute node. In embodiments, aspects of the disclosure relate to the recognition that the permission of an administrator may be necessary in order to change the compliance configuration of the asset. Accordingly, in embodiments, a permission request to change the first compliance level to the second compliance level may be transmitted to a root user by a hypervisor. The permission request may include a query, application, or other solicitation asking for authorization to change the first compliance level to the second compliance level. In embodiments, the hypervisor may be configured to transmit the permission request to a root user. The root user may include an administrator, network manager, or other individual, organization, computer system, or entity that maintains authority to grant permission to modify the compliance configuration of the asset. In embodiments, in response to migrating the asset from the source compute node to the target compute node and determining a mismatch between the compliance level of the asset and the target compute node, the hypervisor may be configured to generate and send the permission request to the root user. Other methods of transmitting the permission request are also possible.

In embodiments, an authorization to change the first compliance level to the second compliance level may be received by the hypervisor from the root user at module 544. Generally, receiving can include collecting, acquiring, obtaining, or otherwise accepting delivery of the authorization to change the first compliance level to the second compliance level. In embodiments, the authorization may be received as a response to the permission request transmitted to the root user by the hypervisor. The authorization may include consent, approval, or other indication that grants permission to change the first compliance level to the second compliance level. As described herein, the authorization may be transmitted to the hypervisor by the root user. For instance, in response to migrating the asset from the source compute node to the target compute node, the hypervisor may submit a permission request to the root user asking for approval to change the first compliance level of the asset to a second compliance level to match the target compute node. Accordingly, the root user may respond by transmitting authorization of the compliance level change to the hypervisor. Other methods of receiving the authorization to change the first compliance level to the second compliance level are also possible.

In embodiments, an indication of the authorization may be published at module 545. The indication of the authorization may be published by the root user for a set of subscriber administrator-users. Generally, publishing can include disclosing, declaring, announcing, or otherwise making the indication of the authorization public to the set of subscriber administrator-users. In embodiments, the set of subscriber administrator-users may include other individuals or computer systems that are associated with the network environment that includes the source compute node and the target compute node. As an example, the set of subscriber administrator-users may include other compute nodes (e.g., or administrators of those compute nodes) located in the set of compute nodes. As another example, the set of subscriber administrator-users may include clients that are provided access to one or more compliance configuration management operations (e.g., on a subscription basis). In embodiments, publishing may include editing a set of access permissions maintained in a central directory (e.g., trusted migration monitor database) to indicate that authorization to change the compliance level of the asset from the first compliance level to the second compliance level has been granted. Other methods of publishing the indication of the authorization are also possible.

In embodiments, an authentication to change the first compliance level to the second compliance level may be received from a migration monitor at module 546. Generally, receiving can include collecting, acquiring, obtaining, or otherwise accepting delivery of the authentication to change the first compliance level to the second compliance level. Aspects of the disclosure, in embodiments, relate to using a migration monitor to authorize changes with respect to the compliance configuration of an asset. The migration monitor may include a central computing system, server, or other module configured to manage the migration and compliance configurations of assets and compute nodes within a particular network environment. Accordingly, in certain embodiments, the migration monitor may maintain administrative privileges, and be configured to evaluate a permission request to change the compliance level of an asset. As an example, the migration monitor may assess the nature of the asset (e.g., security protocols, data sensitivity, resource requirements, source host) as well as the configuration of the target compute node, and determine whether or not a compliance level change for the asset is necessary. In response to determining that a compliance level change for the asset is appropriate (e.g., associated with positive impacts for the asset, the source compute node, the target compute node, or other aspect of the network environment), the migration monitor may transmit an authentication (e.g., approval, permission) indicating that the compliance level change may be performed. In embodiments, the authentication may be received by hypervisor. Other methods of receiving the authentication to change the first compliance level to the second compliance level from the migration monitor are also possible.

In embodiments, a denial to change a first compliance level to a second compliance level may be received at module 547. As described herein, receiving can include collecting, acquiring, obtaining, or otherwise accepting delivery of the denial to change the first compliance level. The denial may include a veto, repudiation, dismissal, or rejection to change the first compliance level. In certain embodiments, the denial may be received from a root user. In certain embodiments, the denial may be received from a migration monitor. For instance, in response to analyzing the nature of the asset (e.g., security protocols, data sensitivity, resource requirements, source host) as well as the configuration of the target compute node, the migration monitor may determine that a change to the compliance level of the asset may not be suitable for the present situation (e.g., may lead to data vulnerabilities, negative impacts with respect to the network environment). As such, the hypervisor may receive a denial to change the first compliance level from the migration monitor. In embodiments, in response to receiving the denial to change the first compliance level to the second compliance level, both a migration and a modification may be prevented. Generally, preventing can include restricting, limiting, blocking, halting, or forbidding both migration and modification of the asset. For instance, in certain embodiments, the migration monitor may be configured to alter a set of permissions for the asset (e.g., within a central directory) to indicate that the asset is not permitted to be migrated to one or more nodes of the network, or undergo compliance level changes. Other methods of receiving a denial to change the first compliance level and prevent the migration and modification are also possible.

In embodiments, the second module management system 550 may include a plurality of modules configured to facilitate compliance configuration management for an asset having a first compliance configuration. Aspects of the disclosure, in certain embodiments, relate to the recognition that in situations in which an asset is to be transferred from a lower compliance level environment to a higher compliance level environment, it may be desirable to modify the compliance configuration of the asset prior to migration of the asset to the target compute node (e.g., modification of the compliance configuration for the asset after migration may be associated with security risks for the target compute node.) Accordingly, in embodiments, the first compliance configuration may be modified to a second compliance configuration which matches the expected compliance configuration for the target compute node at module 551. Generally, modifying can include altering, adjusting, reconfiguring, revising, or otherwise changing the first compliance configuration to a second compliance configuration which matches the expected compliance configuration for the target compute node. In embodiments, modifying may include raising or lowering the compliance level of the asset to align (e.g., be substantially equivalent to) the compliance level of the target compute node. For example, one or more characteristics of the asset such as one or more protocols (e.g., data transmission protocols, network communication protocols), stored information (e.g., nature/privacy level of data maintained on the asset) system criterion (e.g., resource usage configurations) and other aspects of the security environment of the asset may be adjusted to match that of the target compute node. In embodiments, in response to modifying the first compliance configuration to the second compliance configuration, the asset (e.g., virtual machine) may be migrated from the source compute node to a target compute node. As described herein, migrating may include performing a data transfer operation to relocate files related to the asset from an original directory of the source compute node to a destination directory on a storage device of the target compute node. In embodiments, migrating may include configuring the target compute node to operate the asset (e.g., allocating resources for the asset, modifying network ports/communication protocols for the asset). Other methods of modifying the first compliance configuration and migrating the asset to the target compute node are also possible.

In embodiments, a second compliance level of the second compliance configuration may exceed a first compliance level of the first compliance configuration at module 552. As described herein, the first and second compliance level may indicate quantitative measurements of the degree of security maintained by a particular asset or compute node (e.g., Level 1, Level 2, Level 3). Accordingly, in embodiments, the second compliance level (e.g., of the target compute node) may be greater than a first compliance level (e.g., of the asset), such that the asset is transferred from an environment having lower security to an environment having higher security. As such, aspects of the disclosure relate to first modifying the compliance configuration of the asset by raising the compliance level of the asset to match that of the target compute node, and subsequently migrating the asset from the source compute node to the target compute node. Other methods of managing the asset are also possible.

Consider the following example. An asset may include a virtual machine having a set of data regarding population statistics for a variety of different countries. Accordingly, the first compliance configuration may be associated with a substantially low security level (e.g., population statistics may be publically available, non-sensitive data). For instance, the asset may be associated with a compliance level of Level 4 (e.g., substantially relaxed security). In embodiments, the asset may be scheduled to be migrated from a source compute node to a target compute node having a compliance level of Level 3 (e.g., stricter security than Level 4). As described herein, in certain embodiments aspects of the disclosure relate to transferring assets from environments having lower compliance levels to assets having higher compliance levels. In embodiments, the asset may first be modified to raise the compliance level of the asset from Level 4 to Level 3. As an example, raising the compliance level of the asset may include encrypting the data on the asset with a more secure type of encryption (e.g., to match the encryption of the target asset). As another example, raising the compliance level may include scanning the asset to determine that no security vulnerabilities are present in the asset (e.g., vulnerabilities that may be transferred to the target compute node). In response to raising the compliance level of the asset (e.g., from Level 4 to Level 3), the asset may be migrated from the source compute node to the target compute node. Other methods of modifying the first compliance configuration and migrating the asset are also possible.

In embodiments, both the modifying and the migrating may each occur in an automated fashion without user intervention at module 553. Aspects of the disclosure relate to the recognition that, in certain situations in which an asset is transferred from a lower compliance level environment (e.g., Level 4) to a higher compliance level environment (e.g., Level 2), a user or administrator's authorization may not be necessary (e.g., as the asset is being protected using stricter security). In embodiments, the modifying and migrating may both be performed by a migration monitor module configured to manage asset placement and compliance configurations. For instance, the migration monitor module may be configured to analyze the source compute node, the target compute node, and the asset in order to determine the appropriate compliance level and migration method, and then perform the modifying and migrating without manual action. Other methods of managing the modifying and the migrating without user intervention are also possible.

Figure 6:
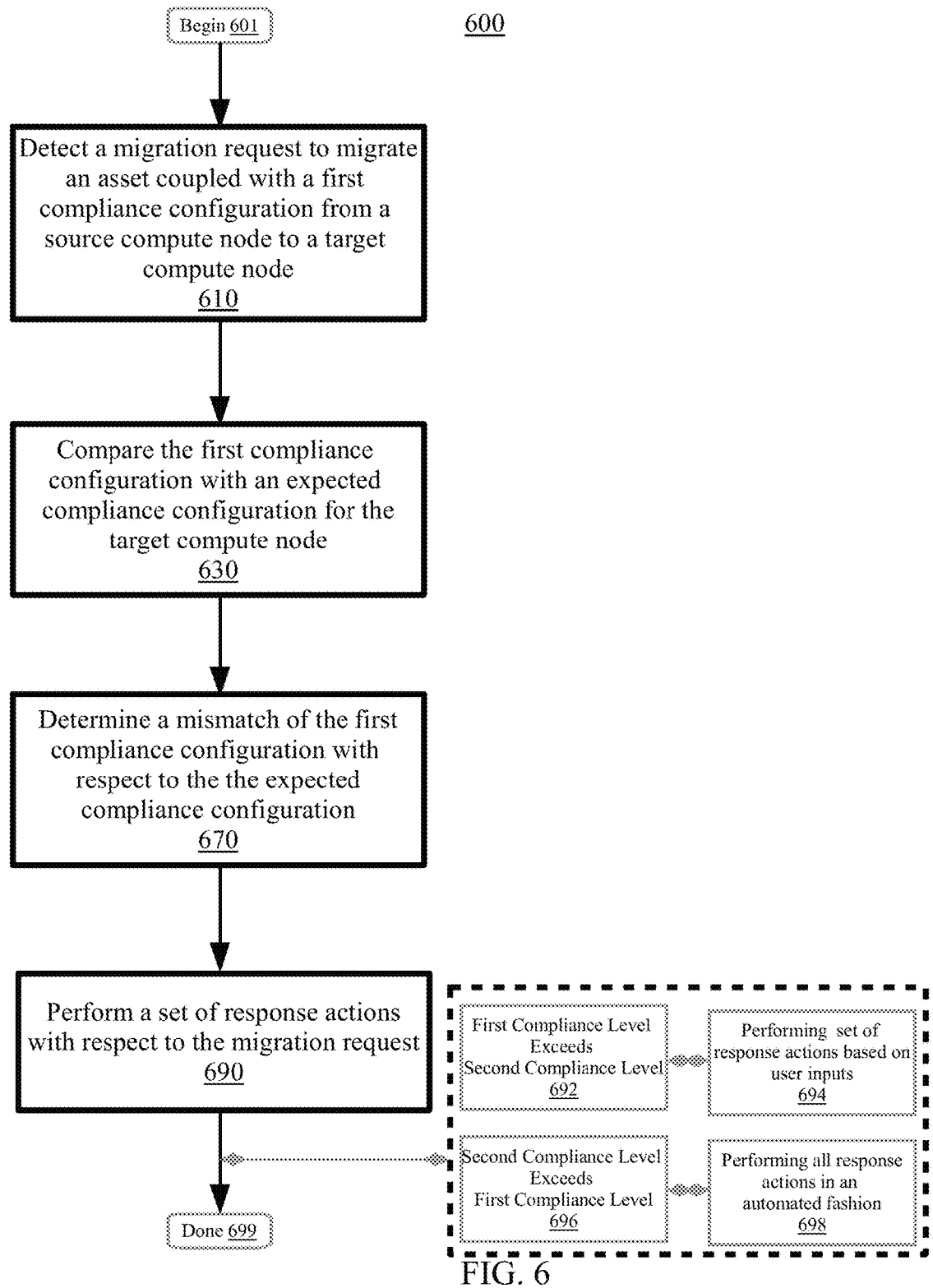
FIG. 6 is a flowchart illustrating a method of compliance configuration management for asset migration on a shared pool of configurable computing resources having a set of compute nodes, according to embodiments.

FIG. 6 is a flowchart illustrating a method 600 of compliance configuration management for asset migration on a shared pool of configurable computing resources having a set of compute nodes. Aspects of FIG. 6 relate to performing one or more response actions based on the relationship between a first compliance level of the first compliance configuration and the second compliance level of the second compliance configuration. The compliance levels of assets may be dynamically modified based on a compliance configuration of a compliance group (e.g., target compute node) to which the asset is migrated. In this way, the compliance levels and security protocols of the asset may be aligned with those of the new host to facilitate data security of information stored on the asset and promote safe operation of the asset on the target compute node. Aspects of FIG. 6 may substantially correspond to embodiments described herein and in the FIGS. 1-8. At block 610, a migration request to migrate an asset may be detected. At block 630, a first compliance configuration of the asset may be compared with an expected compliance configuration of the target compute node. At block 670, a mismatch of the first compliance configuration with respect to the expected compliance configuration may be determined. At block 690, a set of response actions with respect to the migration request may be performed. Leveraging dynamic adjustment of compliance levels may be associated with increased data transfer efficiency and data security. The method 600 may begin at block 601.

In embodiments, a first compliance level of the first compliance configuration may exceed a second compliance level of the second compliance configuration at block 692. In certain embodiments, the first compliance level (e.g., of the asset) may be greater than a second compliance level (e.g., of the target compute node), such that the asset is transferred from an environment having higher security (e.g., greater compliance level) to an environment having lower security (e.g., lesser compliance level). In embodiments, the set of response actions may be performed in reliance upon one or more user inputs at block 694. Generally, performing the set of response actions may include executing, initializing, instantiating, carrying-out, or otherwise implementing the set of response actions in response to the input of a user. The inputs may include messages (e.g., electronic mail) from an administrator, user responses (e.g., via dialogue boxes) or the like. As described herein, aspects of the disclosure relate to the recognition that, when transferring an asset from an environment having relatively high security to an environment having lower security, it may be desirable to have the asset migration and compliance level change authorized by a user (e.g., to maintain data security). Accordingly, a user or administrator of the network environment may manually perform one or more response operations (e.g., managing data on the asset, adjusting security protocols) to migrate the asset from the source compute node to the target compute node and modify the compliance configuration of the asset. Other methods of performing the set of response actions in reliance upon one or more user inputs are also possible.

In embodiments, a second compliance level of the second compliance configuration may exceed the first compliance level of the first compliance configuration at block 696. Accordingly, in embodiments, the second compliance level (e.g., of the target compute node) may be greater than a first compliance level (e.g., of the asset), such that the asset is transferred from an environment having lower security to an environment having higher security. In embodiments, all aspects of the set of response actions may be performed in an automated fashion without user intervention at block 698. Aspects of the disclosure relate to the recognition that, in certain situations in which an asset is transferred from a lower compliance level environment (e.g., Level 4) to a higher compliance level environment (e.g., Level 2), a user or administrator's authorization may not be necessary (e.g., as the asset is being protected using stricter security) to perform the migration or modification of the compliance configuration for the asset. In embodiments, all aspects of the set of response actions (e.g., compliance level modification, migration) may be performed by a migration monitor module configured to manage asset placement and compliance configurations. For instance, the migration monitor module may be configured to analyze the source compute node, the target compute node, and the asset in order to determine the appropriate compliance level and migration method, and then perform the steps of the response actions using automated computing machinery. Other methods of managing the set of response actions without user intervention are also possible. The method 600 may conclude at block 699.

Figure 7:
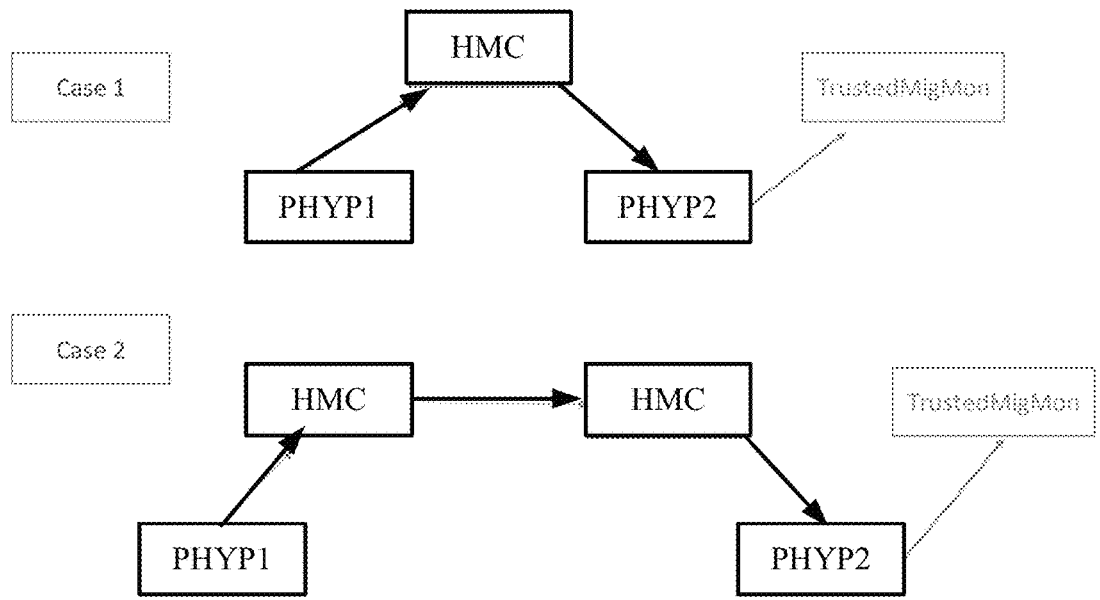
FIG. 7 is a diagram illustrating a visual representation of compliance configuration management for a shared pool of configurable computing resources having a set of compute nodes, according to embodiments.
Figure 7:
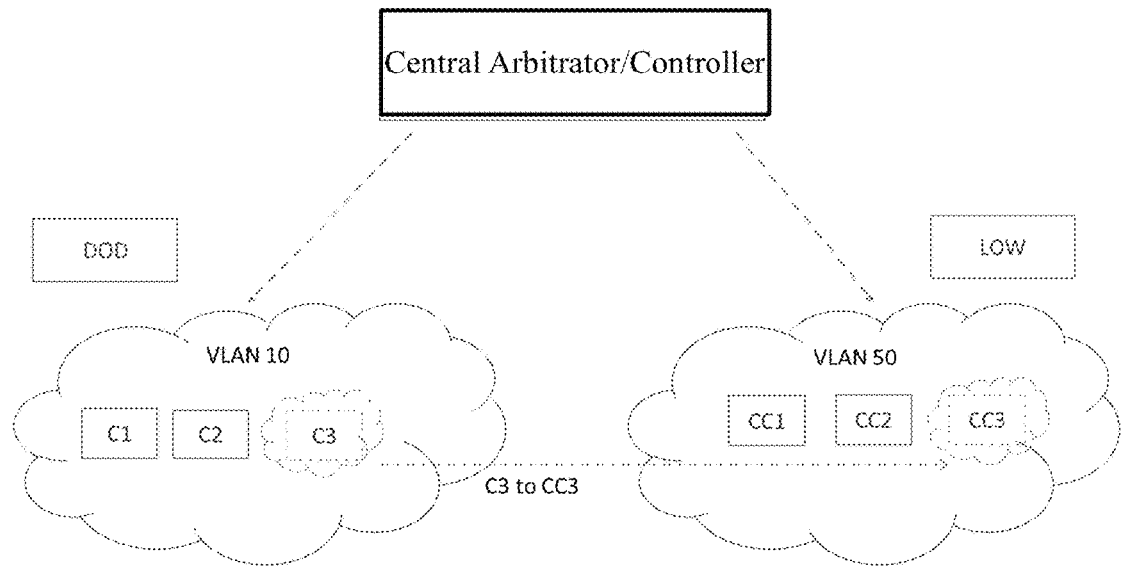

FIG. 7 is a diagram illustrating a visual representation 700 of compliance configuration management for a shared pool of configurable computing resources having a set of compute nodes. Aspects of FIG. 7 relate to a system 710 for providing authorization to perform one or more response actions with respect to an asset to be transferred from a source compute node having a higher compliance level to a target compute node having a lower compliance level. As shown in Case 1 of FIG. 7, a first compute node Phyp1 may send a permission request to a hardware management console (HMC) requesting authentication for one or more response actions (e.g., compliance level change, migration). The HMC may forward the permission request to a trusted migration monitor (e.g., TrustedMigMon) located on a second compute node Phyp2. Accordingly, the trusted migration monitor may provide approval or denial of the permission request to the first compute node Phyp1 via the HMC. In certain embodiments, as shown in Case 2 of FIG. 7, the trusted migration monitor may be located on a second compute node Phyp2 that is managed by a second hardware management console. Accordingly, in such a scenario, the first HMC may transmit a permission request from the first compute node Phyp1 to the trusted migration monitor via the second HMC. Other methods of managing the permission request and authorization for the set of response actions are also possible.

In embodiments, aspects of FIG. 7 relate to a system 750 for performing one or more response actions with respect to an asset to be transferred from a source compute node having a higher compliance level to a target compute node having a lower compliance level. The trusted migration monitor may include a central arbitrator controller configured to manage permission requests to perform one or more response actions. In embodiments, prior to initiating the migration of the asset from the first compute node to the second compute node, an authentication of the trusted migration monitor administrator may be performed. In response to the authentication, the asset (e.g., C3) may be migrated from a source compute node (e.g., VLAN10) to a target compute node (e.g., VLAN50). Once the migration of the asset is complete, the trusted migration monitor may configure the asset to align it with the compliance level of the target compute node. As described herein, in embodiments, when migrating the asset from a substantially high compliance level environment to a lower compliance level environment, modification of the compliance level of the asset may be performed after migration of the asset (e.g., modifying the compliance level of the asset prior to migration to the target compute node may be associated with security vulnerabilities on the source compute node). Other methods of performing the one or more response actions are also possible.

Figure 8:
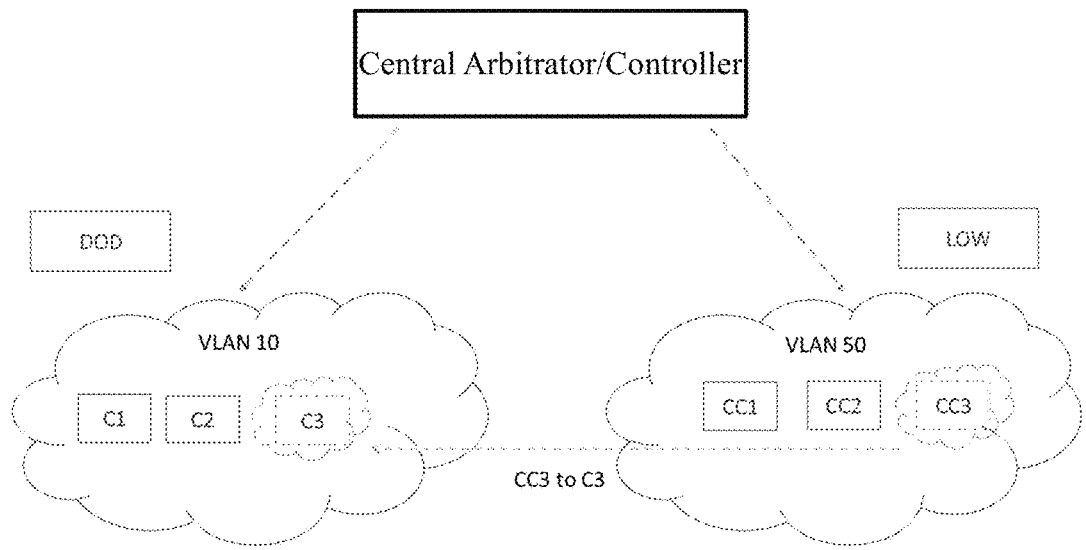
FIG. 8 is a diagram illustrating a visual representation of compliance configuration management for a shared pool of configurable computing resources having a set of compute nodes, according to embodiments.
Figure 8:
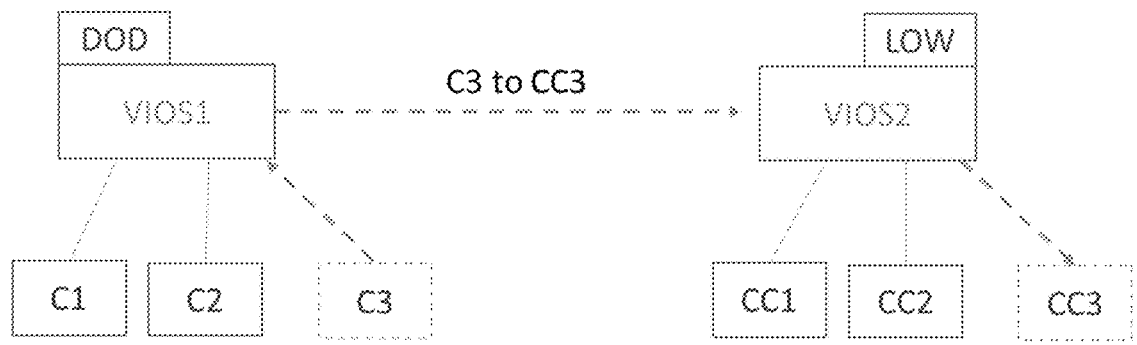

FIG. 8 is a diagram illustrating a visual representation 800 of compliance configuration management for a shared pool of configurable computing resources having a set of compute nodes. Aspects of FIG. 8 relate to migration of an asset from a source compute node having a lower compliance level to a target compute node having a higher compliance level. FIG. 8 illustrates a system 810 for modification of the compliance configuration of an asset (e.g., virtual machine CC3) from a source compute node (e.g., VLAN50) to a target compute node (e.g., VLAN10). As described herein, a central arbitrator/controller of a trusted migration monitor may assess the compliance levels of the source compute node and the destination compute node, and determine that the compliance level of the target compute node is higher than that of the source compute node. Accordingly, the trusted migration monitor may initiate modification of the compliance level of the asset to raise it to a compliance level that matches that of the target compute node. As described herein, in embodiments, when migrating the asset from a substantially low compliance level environment to a higher compliance level environment, modification of the compliance level of the asset may be performed prior to migration of the asset (e.g., modifying the compliance level of the asset after migration to the target compute node may be associated with security vulnerabilities on the target compute node). Other methods of managing the asset using the trusted migration monitor are also possible.

In embodiments, aspects of FIG. 8 relate to a system 850 for performing migration of the asset from a source compute node to a target compute node. Aspects of the disclosure relate to the recognition that, in certain situations, migration of assets (e.g., virtual machines) may occur between two Virtual Input/Output Servers (VIOS). For instance, as shown in system 850, an asset C3 may be migrated from VIOS1 to VIOS2. As described herein, the compliance level of the asset may be modified to match the compliance level of VIOS2 (e.g., as the target VIOS controls the input/output protocol of the Virtual Input/Output Client of the asset). Other methods of migrating the asset from a source compute node to a target compute node are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of compliance configuration management for asset migration on a shared pool of configurable computing resources having a set of compute nodes, the method comprising:
    detecting a migration request to migrate, from a source compute node to a target compute node, a virtual machine that includes a first compliance configuration, wherein the first compliance configuration includes an indication of a degree of security maintained by the virtual machine and additionally includes an indication of data transmission protocols suitable for the virtual machine and computing resource requirements of the virtual machine;
    comparing the first compliance configuration included within the virtual machine on the source compute node with an expected compliance configuration for the target compute node;
    determining, based on and in response to the comparing, a mismatch of the first compliance configuration with respect to the expected compliance configuration; and
    in response to determining a mismatch of the first compliance configuration with respect to the expected compliance configuration, performing, with respect to the migration request, a set of response actions, the set of response actions including:
        migrating the virtual machine from the source compute node to the target compute node; and
        in response to migration of the virtual machine, modifying data included in the virtual machine and data security protocols of the compliance configuration of the virtual machine by encrypting the data included in the asset.

2. The method of claim 1, further comprising:
    marking, in response to determining the mismatch and in advance of performing the set of response actions, the virtual machine with an indication that the virtual machine is scheduled for a modification to the first compliance configuration.

3. The method of claim 1, wherein the set of response actions includes:
    migrating the virtual machine from the source compute node to the target compute node; and
    modifying, in response to migrating the virtual machine, the first compliance configuration to a second compliance configuration which matches the expected compliance configuration for the target compute node.

4. The method of claim 3, wherein a first compliance level of the first compliance configuration exceeds a second compliance level of the second compliance configuration.

5. The method of claim 4, further comprising:
    transmitting, by a hypervisor to a root user, a permission request to change the first compliance level to the second compliance level.

6. The method of claim 5, further comprising:
    receiving, by the hypervisor from the root user, an authorization to change the first compliance level to the second compliance level.

7. The method of claim 6, further comprising:
    receiving, from a migration monitor, an authentication to change the first compliance level to the second compliance level.

8. The method of claim 1, further comprising:
    receiving a denial to change a first compliance level to a second compliance level; and
    preventing both a migration and a modification.

9. The method of claim 1, wherein the set of response actions includes:
    modifying the first compliance configuration to a second compliance configuration which matches the expected compliance configuration for the target compute node; and
    migrating, in response to modifying the first compliance configuration to the second compliance configuration, the virtual machine from the source compute node to the target compute node.

10. The method of claim 9, wherein a second compliance level of the second compliance configuration exceeds a first compliance level of the first compliance configuration.

11. The method of claim 10, wherein both the modifying and the migrating each occur in an automated fashion without user intervention.

12. The method of claim 1, wherein when a first compliance level of the first compliance configuration exceeds a second compliance level of the second compliance configuration:
    performing the set of response actions in reliance upon one or more user inputs; and when the second compliance level of the second compliance configuration exceeds the first compliance level of the first compliance configuration:
    performing all aspects of the set of response actions in an automated fashion without user intervention.

13. The method of claim 1, wherein performing the set of response actions includes:
    using a hypervisor to communicate between a cloud manager and the set of compute nodes.

14. The method of claim 1, wherein the detecting, the comparing, the determining, and the performing each occur in an automated fashion without user intervention.

15. The method of claim 1, further comprising:
    metering use of the compliance configuration management, wherein metering the use includes tracking an amount of data transferred using compliance configuration management; and
    generating an invoice based on the metered use.

16. A system of compliance configuration management for a shared pool of configurable computing resources having a set of compute nodes, the system comprising:

a memory having a set of computer readable computer instructions, and a processor for executing the set of computer readable instructions, the set of computer readable instructions including:

detecting a migration request to migrate, from a source compute node to a target compute node, a virtual machine that includes a first compliance configuration, wherein the first compliance configuration includes an indication of a degree of security maintained by the virtual machine and additionally includes an indication of data transmission protocols suitable for the virtual machine and computing resource requirements of the virtual machine;

comparing the first compliance configuration included within the virtual machine on the source compute node with an expected compliance configuration for the target compute node;

determining, based on and in response to the comparing, a mismatch of the first compliance configuration with respect to the expected compliance configuration; and in response to determining a mismatch of the first compliance configuration with respect to the expected compliance configuration, performing, with respect to the migration request, a set of response actions, the set of response actions including:

migrating the virtual machine from the source compute node to the target compute node; and in response to migration of the virtual machine, modifying data included in the virtual machine and data security protocols of the compliance configuration of the virtual machine by encrypting the data included in the asset.

17. A computer program product of compliance configuration management for a shared pool of configurable computing resources having a set of compute nodes, the computer program product comprising a computer readable storage medium having program instructions embodied therewith, wherein the computer readable storage medium is not a transitory signal per se, the program instructions executable by a processor to cause the processor to perform a method comprising:

detecting a migration request to migrate, from a source compute node to a target compute node, a virtual machine that includes a first compliance configuration, wherein the first compliance configuration includes an indication of a degree of security maintained by the virtual machine and additionally includes an indication of data transmission protocols suitable for the virtual machine and computing resource requirements of the virtual machine;

comparing the first compliance configuration included within the virtual machine on the source compute node with an expected compliance configuration for the target compute node;

determining, based on and in response to the comparing, a mismatch of the first compliance configuration with respect to the expected compliance configuration; and in response to determining a mismatch of the first compliance configuration with respect to the expected compliance configuration, performing, with respect to the migration request, a set of response actions, the set of response actions including:

migrating the virtual machine from the source compute node to the target compute node; and in response to migration of the virtual machine, modifying data included in the virtual machine and data security protocols of the compliance configuration of the virtual machine by encrypting the data included in the asset.

18. The computer program product of claim 17, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to the remote data processing system for use in a second computer readable storage medium with the remote data processing system.

* * * * *